United States Patent
Kobayashi et al.

(10) Patent No.: US 10,305,343 B2
(45) Date of Patent: May 28, 2019

(54) WATERPROOF STRUCTURE FOR ELECTRIC MOTOR

(71) Applicant: FANUC CORPORATION, Yamanashi (JP)

(72) Inventors: Kouji Kobayashi, Yamanashi (JP); Takeshi Tamaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 5 days.

(21) Appl. No.: 15/483,150

(22) Filed: Apr. 10, 2017

(65) Prior Publication Data

US 2017/0302122 A1 Oct. 19, 2017

(30) Foreign Application Priority Data

Apr. 14, 2016 (JP) .................... 2016-080875

(51) Int. Cl.
*H02K 5/10* (2006.01)
(52) U.S. Cl.
CPC ....................... *H02K 5/10* (2013.01)
(58) Field of Classification Search
CPC ........................................................ H02K 5/10
USPC ........................................................ 310/87, 88
See application file for complete search history.

(56) References Cited

U.S. PATENT DOCUMENTS

| | | | | |
|---|---|---|---|---|
| 2002/0190428 A1* | 12/2002 | Tamura | ............. | B29C 45/14336 264/259 |
| 2009/0010786 A1* | 1/2009 | Koide | ..................... | F01C 21/10 417/423.14 |
| 2017/0093252 A1* | 3/2017 | Otsubo | ............... | F04D 13/0606 |

FOREIGN PATENT DOCUMENTS

| | | |
|---|---|---|
| CN | 101321951 A | 12/2008 |
| CN | 206628928 U | 11/2017 |
| JP | S59-103993 A | 6/1984 |
| JP | 2001-245453 A | 9/2001 |
| JP | 2001245453 A * | 9/2001 |
| JP | 2010-226907 A | 10/2010 |
| JP | 2014-143899 A | 8/2014 |
| WO | 2016/013429 A1 | 1/2016 |

OTHER PUBLICATIONS

Machine Translation, Takahashi, JP-2001245453-A, Sep. 2001. (Year: 2001).*
An Office Action; "Decision to Grant a Patent" issued by the Japanese Patent Office dated Mar. 27, 2018, which corresponds to Japanese Patent Application No. 2016-080875.
An Office Action issued by the Chinese Patent Office (SIPO) dated Jun. 29, 2018, which corresponds to Chinese Patent Application No. 201710237260.4 and is related to U.S. Appl. No. 15/483,150; with English language translation.

* cited by examiner

*Primary Examiner* — Thomas Truong
(74) *Attorney, Agent, or Firm* — Studebaker & Brackett PC

(57) ABSTRACT

To provide a waterproof structure for an electric motor that can more reliably seal a boundary at which an insert component of a stator and a mold resin join. A sealing member (5) includes a first sealing part (55) arranged more to a side of an insert component (3) than a joint (23), a second sealing part (56) arranged more to a side of a mold resin (4) than the joint (23), and a connecting part (57) that connects the first and second sealing parts (55, 56).

3 Claims, 9 Drawing Sheets

WATERPROOF STRUCTURE FOR ELECTRIC MOTOR

This application is based on and claims the benefit of priority from Japanese Patent Application No. 2016-080875, filed on 14 Apr. 2016, the content of which is incorporated herein by reference.

BACKGROUND OF THE INVENTION

Field of the Invention

The present invention relates to a waterproof structure for an electric motor that molds insert components of a stator in mold resin.

Related Art

Conventionally, in stators of this type of electric motor, a gap forms due to the temperature change after molding at the boundary at which the insert component and mold resin join, because of the difference in linear expansion coefficients between the two. A waterproofing treatment may be performed on this gap.

Therefore, as shown in FIG. 10, it has been attempted to waterproofing treat a gap such as that described above using an O-ring 105 (also refer to Patent Document 1). However, it is difficult to position the sealing point thereof at the boundary at which the insert component 103 and mold resin 104 join, and the O-ring 105 cannot seal in the case of the position between the sealing point and boundary shifting.

To address this, as shown in FIG. 11, it has been attempted to waterproofing treat a gap such as that described above using a packing 205 having a sheet-like (rectangular) cross-section. However, the sheet-like packing 205 can improve the positional shifting between the sealing point and boundary; while on the other hand, the surface pressure does not rise compared to the O-ring 105, and thus the sealing property is weak, and it may not be possible to seal completely.

Patent Document 1: Japanese Unexamined Patent Application, Publication No. 2010-226907

SUMMARY OF THE INVENTION

However, in the waterproofing treatment using the O-ring 105 or sheet-like packing 205, due to the sealing being insufficient either way, reinforcing the seal has been carried out by soaking in a sealing agent 150, 250 in order to fill the gap at the boundary, as shown in FIGS. 10 and 11. Man-hours have thereby been required for this.

The present invention has an object of providing a waterproof structure for an electric motor that can more reliably seal the boundary at which the insert component of the stator and mold resin join, without requiring man-hours for soaking in a sealing agent.

According to a first aspect of the present invention, in a waterproof structure for an electric motor (for example, the electric motor 1 described later) that molds an insert component (for example, the insert component 3 described later) of a stator (for example, the stator 2 described later) with a mold resin (for example, the mold resin 4 described later), disposes a sealing member (for example, the sealing member 5 described later) at an end region (for example, the end region 20 described later) of the stator including a joint (for example, the joint 23 described later) between the insert component and the mold resin, and fixes the sealing member to the end region by way of an end flange (for example, the end flange 6 described later), the sealing member includes: a first sealing part (for example, the first sealing 55 described later) that is disposed more to a side of the insert component than the joint, and seals an end of the insert component; a second sealing part (for example, the second sealing part 56 described later) that is disposed more to a side of the mold resin than the joint, and seals an end of the mold resin; and a connecting part (for example, the connecting part 57 described later) that is separated from the ends of both the insert component and the mold resin, and connects the first sealing part and the second sealing part.

According to a second aspect of the present invention, in the waterproof structure for an electric motor as described in the first aspect, the sealing member may have inside thereof a rigid body.

According to the present invention, it is possible to more reliably seal a boundary at which an insert component of a stator and a mold resin join, without requiring man-hours for soaking in a sealing agent.

DETAILED DESCRIPTION OF THE INVENTION

Figure 1:
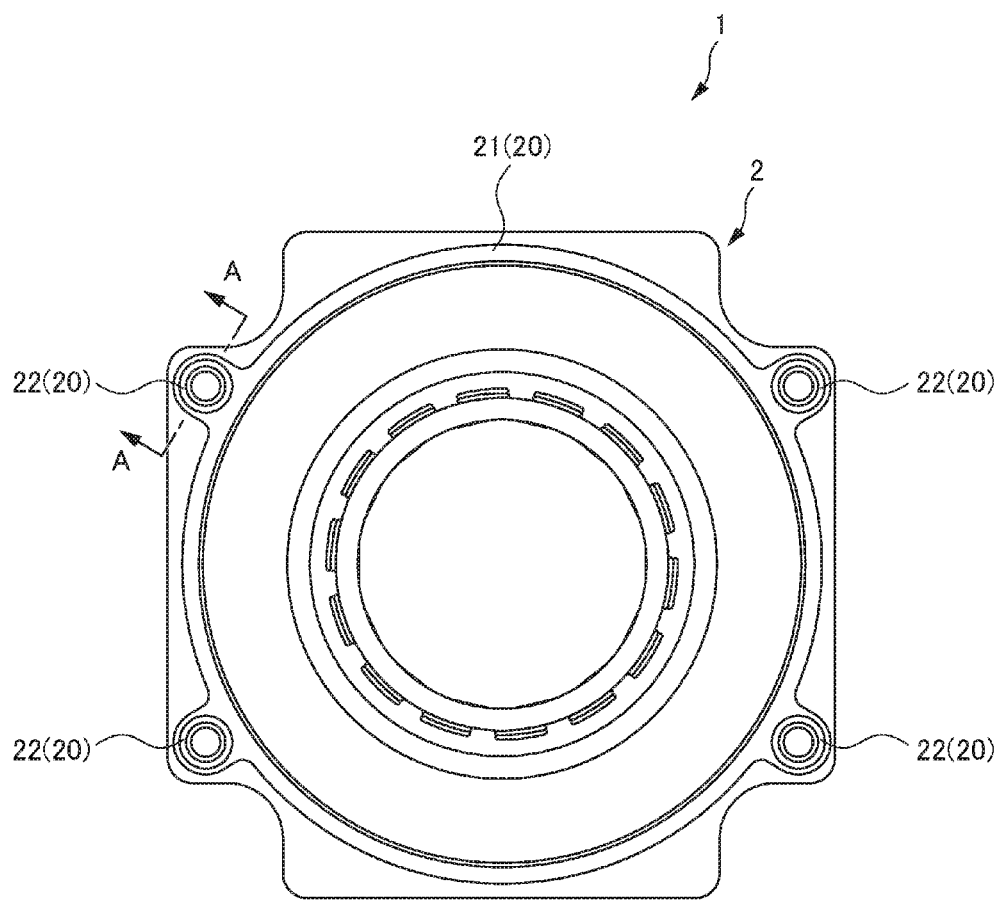
FIG. 1 is an end view showing a stator of an electric motor according to a first embodiment.
Figure 2:
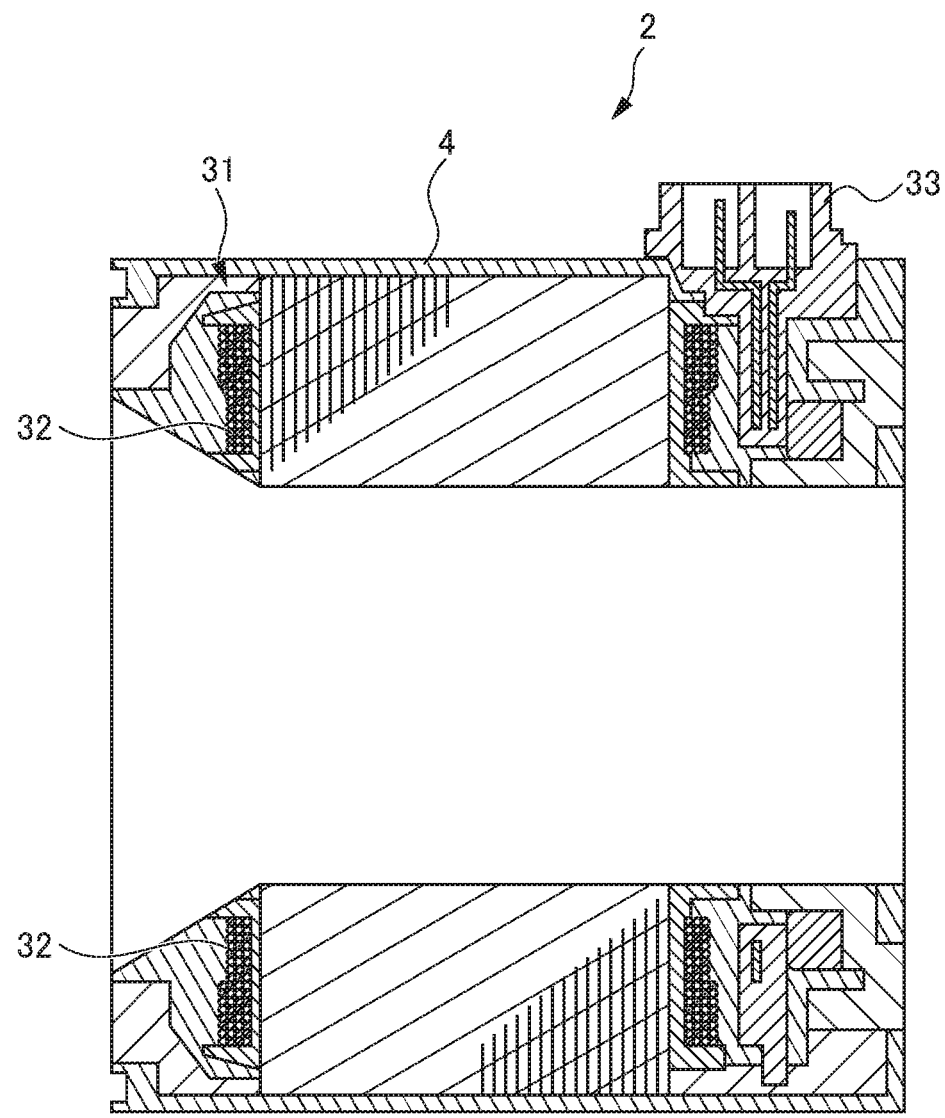
FIG. 2 is a cross-sectional side view of the stator in FIG. 1.
Figure 3:
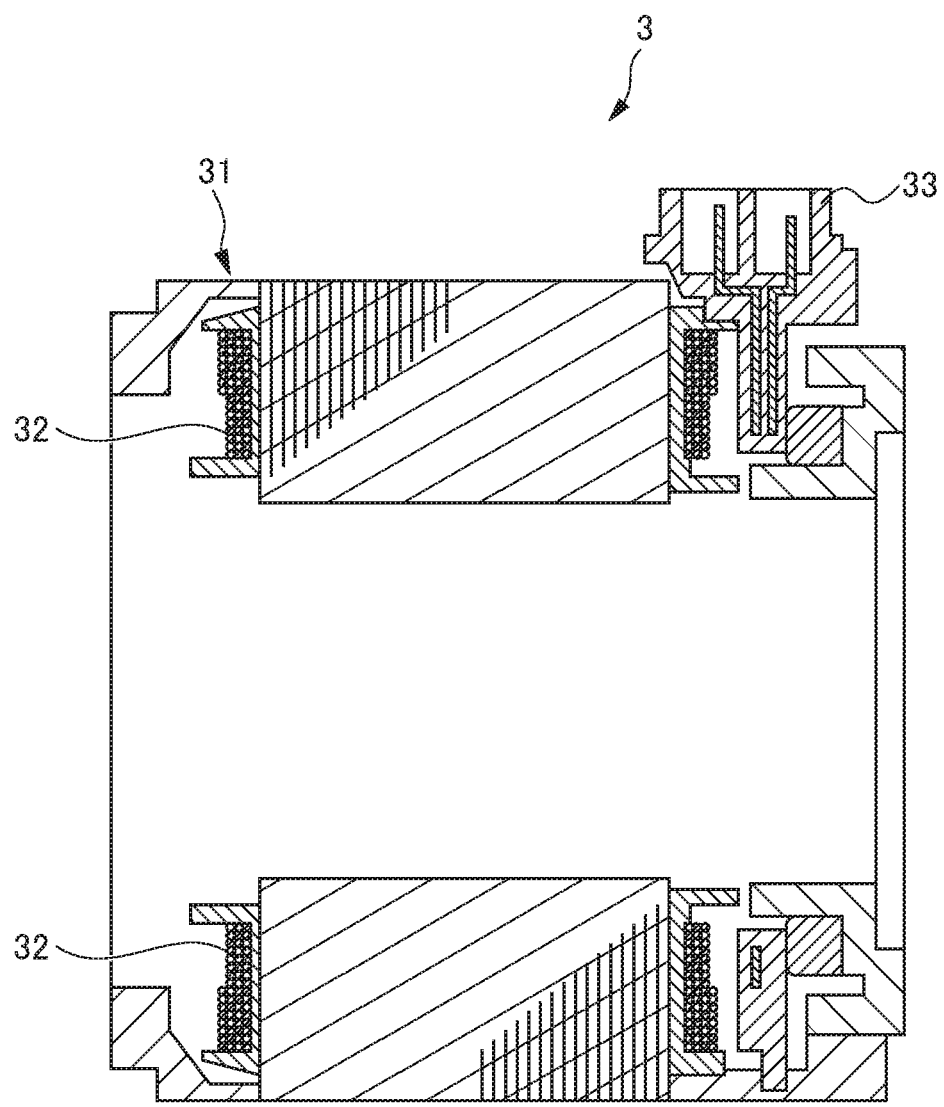
FIG. 3 is a cross-sectional side view of an insert component of the stator in FIG. 2.
Figure 4:
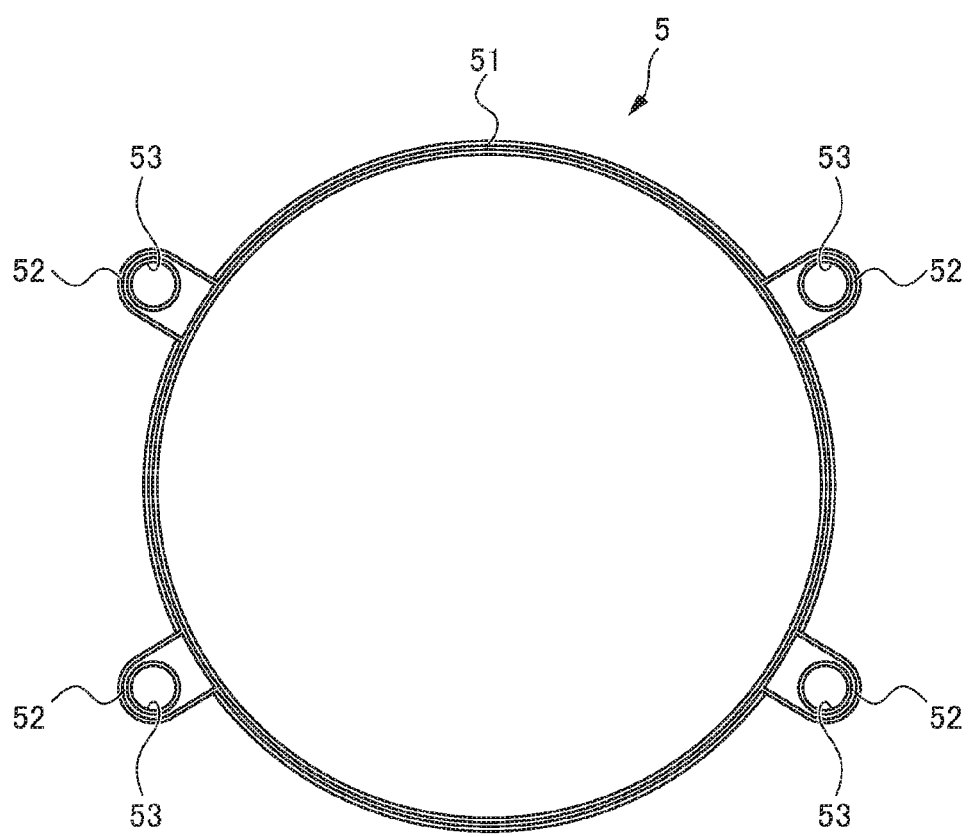
FIG. 4 is a view showing a sealing member of the stator in FIG. 1.
Figure 5:
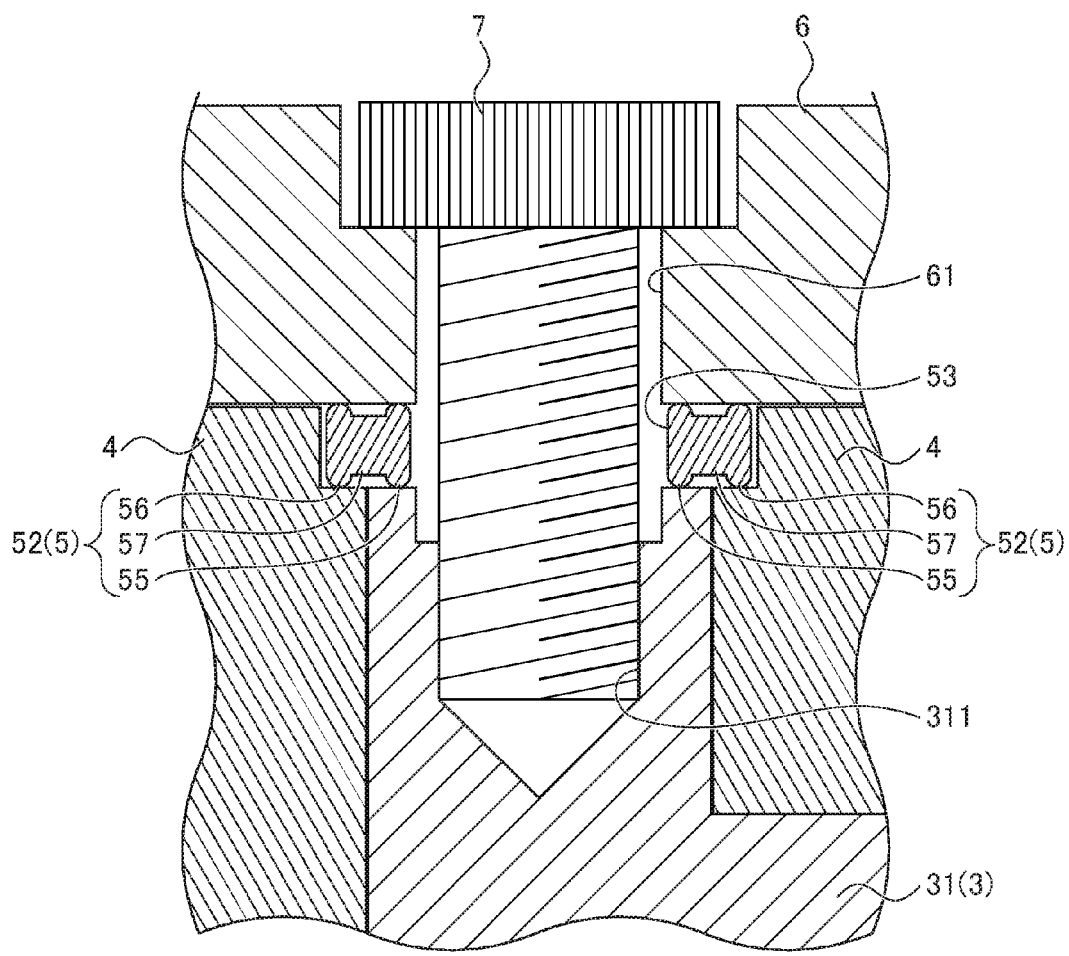
FIG. 5 is an enlarged view showing a cross section along the line A-A in FIG. 1.
Figure 6:
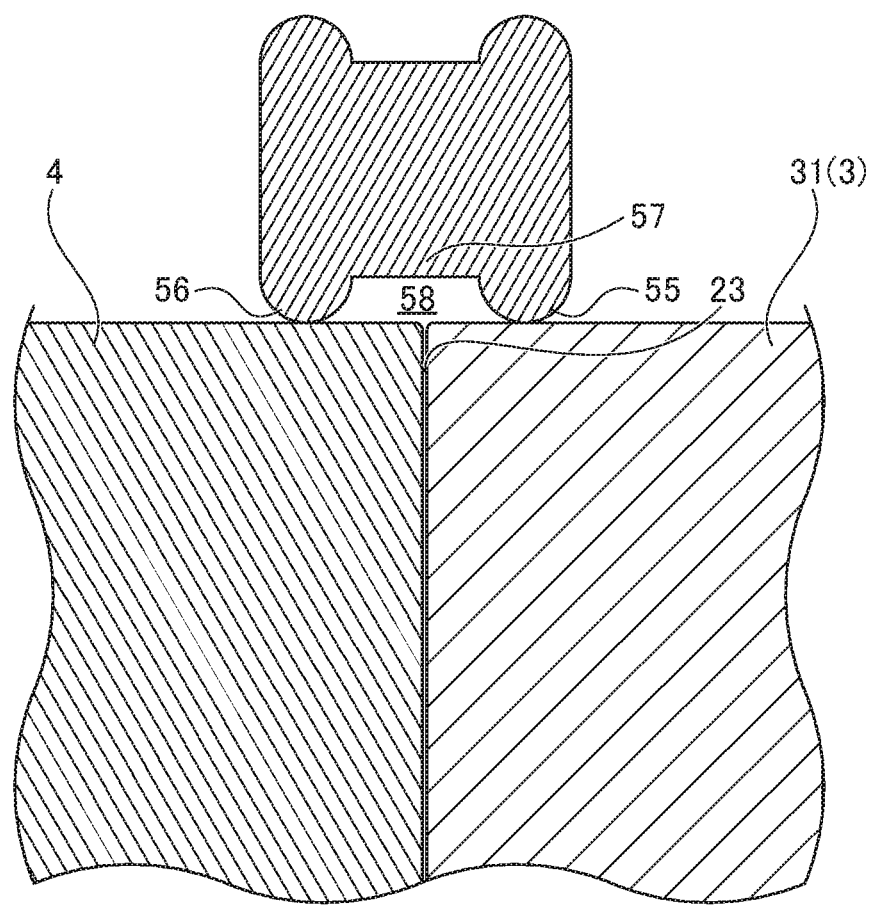
FIG. 6 is an enlarged view showing a principal part in FIG. 5.

Hereinafter, embodiments of the present invention will be explained while referencing the drawings. FIG. 1 is an end view showing a stator of an electric motor according to a first embodiment, and omits an end flange. FIG. 2 is a cross-sectional side view of the stator. FIG. 3 is a cross-sectional side view of an insert component prior to molding with mold resin. FIG. 4 is a view showing a sealing member. FIG. 5 is an enlarged view showing a cross section along the line A-A in FIG. 1. FIG. 6 is an enlarged view showing the principal part in FIG. 5.

As shown in FIGS. 1 to 6, the stator 2 of the electric motor 1 includes an insert component 3, mold resin 4, sealing member 5, end flange 6, and screws 7. As shown in FIG. 3, the insert component 3 includes a housing 31, windings 32, and power connector 33. The housing 31 is formed in the shape of the stator 2 shown in FIG. 1. The windings 32 are wound around a predetermined position of the housing 31 and retained. The power connector 33 is mounted at a predetermined position of the housing 31. The power connector 33 is electrically connected with the windings 32.

The mold resin 4 constitutes the exterior of the stator 2 by molding the periphery of the insert component 3. For this reason, an end region 20 including a jointing part (boundary) between the insert component 3 and mold resin 4 is formed at an end in the axial direction of the stator 2. More specifically, as shown in FIG. 1, the end region 20 is configured by a circular region 21 approximating the diameter of the stator 2, and four mounting regions 22, for example, extending outwards from the circular region 21.

The sealing member 5 is arranged at the end region 20 of the stator 2. More specifically, as shown in FIG. 4, the sealing member 5 is configured integrally by a circular sealing part 51 to be arranged at the circular region 21, and four mounting sealing parts 52, for example, extending outwards from the circular sealing part 51. The sealing member 5 is configured by an elastic body, preferably. To the mounting sealing part 52, a screw through-hole 53 through which the screw 7 passes is provided.

As shown in FIGS. 5 and 6, the mounting sealing part 52 of the sealing member 5 includes a first sealing part 55, second sealing part 56 and connecting part 57. The first sealing part 55 is arranged more to a side of the insert component 3 (specifically, the housing 31) than the joint 23 (refer to FIG. 6), and seals an end of the insert component 3 (housing 31). The second sealing part 56 is arranged more to a side of the mold resin 4 than the joint 23, and seals the end of the mold resin 4. The connecting part 57 is separated from the ends of both the insert component 3 (housing 31) and the mold resin 4, and connects the first sealing part 55 and second sealing part 56.

The end flange 6 covers the end region 20 of the stator 2, and is mounted to the insert component 3 by the screws 7. More specifically, as shown in FIGS. 1 and 5, in the four mounting regions 22 of the end region 20 of the stator 2, threaded holes 311 (refer to FIG. 5) are provided in the housing 31 of the insert component 3. A screw through-hole 61 (refer to FIG. 5) through which the screw 7 passes is provided in the end flange 6.

Then, the circular sealing part 51 of the sealing member 5 is arranged in the circular region 21 of the stator 2, the four mounting sealing parts 52 of the sealing member 5 are arranged in the four mounting regions 22 of the stator 2, the end flange 6 is arranged so as to cover the sealing member 5, and the screws 7 pass through the four screw through-holes 61 of the end flange 6 and the screw through-holes 53 of the four mounting sealing parts 52 of the sealing member 5, and then screw tightened in the threaded holes 311 of the housing 31. When done in this way, the circular sealing part 51 of the sealing member 5 is fixed to the circular region 21 of the stator 2, and the four mounting sealing parts 42 of the sealing member 5 are fixed to the four mounting regions 22 of the stator 2.

At this time, in the mounting region 22 of the stator 2, the first sealing part 55 of the mounting sealing part 52 of the sealing member 5 is positioned more to the side of the housing 31 than the joint 23, and seals the end of the housing 31. The second sealing part 56 of the mounting sealing part 52 of the sealing member 5 is positioned more to the side of the mold resin 4 than the joint 23, and seals the end of the mold resin 4. The connecting part 57 of the mounting sealing part 52 of the sealing member 5 is at a position slightly separated from the joint 23. As a result thereof, the joint 23 is sealed inside a closed space 58 surrounded by the first sealing part 55, second sealing part 56 and connecting part 57 of the sealing member 5, the end face of the housing 31, and the end face of the mold resin 4, as shown in FIG. 6.

In the above way, according to the present embodiment, the joint 23 is sealed within the closed space 58 surrounded by the first sealing part 55, second sealing part 56 and connecting part 57 of the sealing member 5, the end face of the housing 31, and the end face of the mold resin 4. For this reason, there is no concern over the waterproofing ability declining by a gap at the joint 23, even in a case of a gap forming at the joint 23 from a temperature change, due to the difference between the linear expansion coefficient of the housing 31 of the insert component 3 and the linear expansion coefficient of the mold resin 4. As a result thereof, it is unnecessary to soak a sealing agent for filling the gap of the joint 23, and there is no need requiring man-hours to soak in the sealing agent.

The above explanation for the mounting sealing part 52 of the sealing member 5 explained while referencing FIGS. 5 and 6 also applies substantially the same to the circular sealing part 51 of the sealing member 5. For this reason, redundant explanations for the circular sealing part 51 of the sealing member 5 are omitted.

Figure 7:
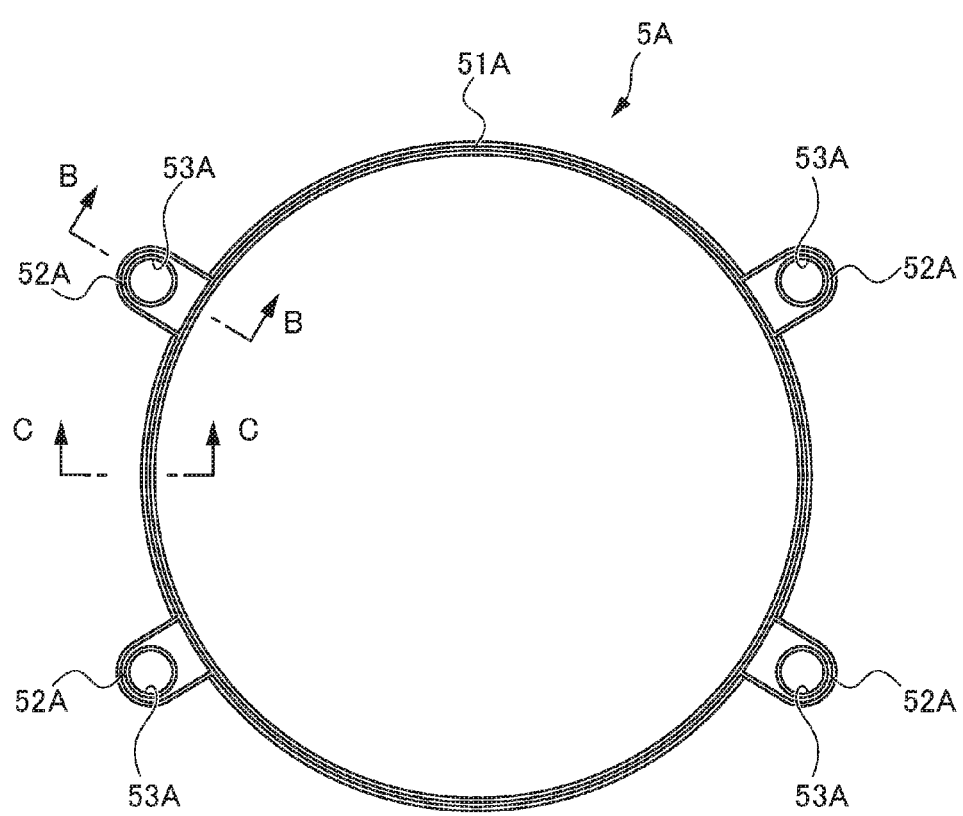
FIG. 7 is a view showing a sealing member according to a second embodiment.
Figure 8:
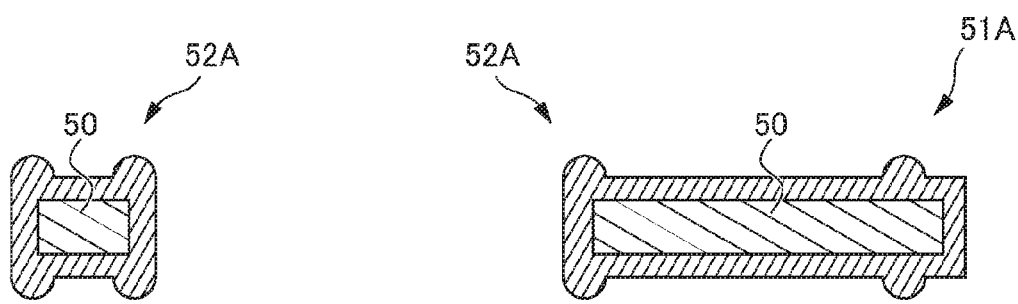
FIG. 8 is an enlarged view showing a cross section along the line B-B in FIG. 7.
Figure 9:
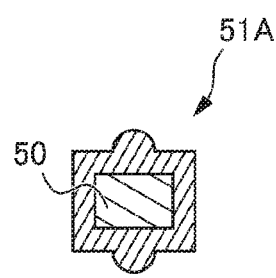
FIG. 9 is an enlarged view showing a cross section along the line C-C in FIG. 7.
Figure 10:
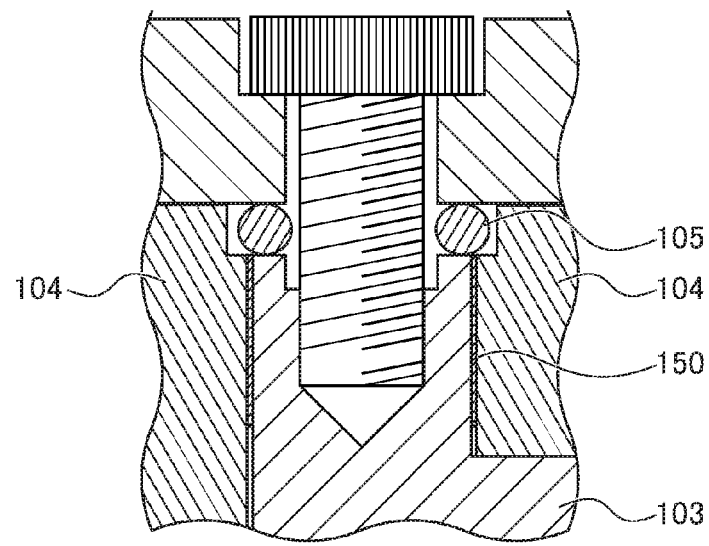
FIG. 10 is a cross-sectional view showing an example of a conventional stator.
Figure 11:
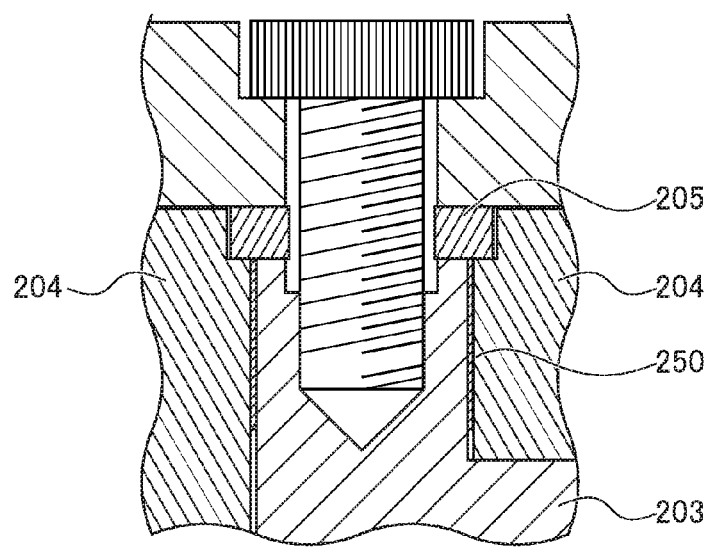
FIG. 11 is a cross-sectional view showing another example of a conventional stator.

FIG. 7 is a view showing a sealing member 5A according to a second embodiment. FIG. 8 is an enlarged view showing a cross section along the line B-B in FIG. 7. FIG. 9 is an enlarged view showing a cross section along the line C-C in FIG. 7. In FIGS. 7 to 9, reference symbols adding "A" to the reference symbols used in the sealing member 5 according to the first embodiment are attached for portions similar to the sealing member 5 according to the first embodiment, and redundant explanations are omitted.

As shown FIGS. 7 to 9, the sealing member 5A has a rigid body 50 at the interior. More specifically, the rigid body 50 is inserted to the interior of the sealing member 5A. This sealing member 5A has rigidity compared to the sealing member 5 according to the first embodiment. For this reason, this sealing member 5A excels in handling property upon arranging (installing) to the end region 20 of the stator 2, and can contribute to automation.

Although embodiments of the present invention have been explained above, the present invention is not to be limited to the aforementioned embodiments, and modifications and improvements within a scope that can achieve the objects of the present invention are also included in the present invention. In addition, the effects described in the present embodiments are merely listing the most preferred effects produced from the present invention, and the effects according to the present invention are not to be limited to those described in the present embodiments.

EXPLANATION OF REFERENCE NUMERALS 1 electric motor
2 stator
20 end region
23 jointing part
3 insert component
4 mold resin
5 sealing member
55 first sealing part
56 second sealing part
57 connecting part
6 end flange

What is claimed is:

1. A waterproof structure for an electric motor that molds an insert component of a stator with a mold resin, disposes a sealing member at an end region of the stator including a joint between the insert component and the mold resin, and fixes the sealing member to the end region by way of an end flange, wherein the sealing member comprises:
        a first sealing part that is disposed more to a side of the insert component than the joint, and seals an end of the insert component;
        a second sealing part that is disposed more to a side of the mold resin than the joint, and seals an end of the mold resin; and
        a connecting part that is separated from the ends of both the insert component and the mold resin, and connects the first sealing part and the second sealing part, and
    wherein the sealing member includes an innermost annular surface that extends to a first curved portion extending in a direction towards the insert component, and to a second curved portion extending in a direction away from the insert component.

2. The waterproof structure of the electric motor according to claim 1, wherein the sealing member includes inside thereof a rigid body.

3. The waterproof structure of the electric motor according to claim 1, wherein the first and second sealing parts protrude symmetrically from the connecting part.

\* \* \* \* \*